United States Patent [19]
Reitzloff et al.

[11] Patent Number: 5,215,346
[45] Date of Patent: Jun. 1, 1993

[54] PICK-UP TRUCK TAILGATE SEATING AND ENTERTAINMENT SYSTEM

[75] Inventors: Cliff R. Reitzloff, Farmington; David M. Glorio, Okemos; David H. Hughes, Auburn Hills, all of Mich.

[73] Assignee: Nissan Research and Development, Inc., Farmington Hills, Mich.

[21] Appl. No.: 904,086

[22] Filed: Jun. 25, 1992

[51] Int. Cl.$^5$ .............................................. B62D 25/00
[52] U.S. Cl. ..................................... 296/51; 296/37.6; 296/65.1
[58] Field of Search ...................... 296/51, 57.1, 65.1, 296/37.6, 24.1

[56] References Cited

U.S. PATENT DOCUMENTS

| | | | |
|---|---|---|---|
| 2,228,203 | 3/1938 | de Hoffmann | 5/119 |
| 2,982,578 | 5/1956 | Lowe | 296/22 |
| 4,444,429 | 4/1984 | Dawes | 296/51 X |
| 4,824,163 | 4/1989 | Hendrych | 296/100 |
| 4,887,526 | 12/1989 | Blatt | 108/44 |
| 5,000,504 | 3/1991 | Munguia | 296/65.1 |

Primary Examiner—Robert R. Song
Attorney, Agent, or Firm—Lowe, Price, LeBlanc & Becker

[57] ABSTRACT

A user-convenience assembly, mountable to an inside surface of a conventional pick-up truck tailgate, is usable with the tailgate placed in a substantially horizontal open position to provide at least one user with bottom and back support on separate cushions provided therefor. Speakers connectable to a sound system of the pick-up truck are disposed adjacent the back support to provide a user music and sound. An element to hold an ashtray and at least one food container can be mounted adjacent the bottom support, and an umbrella holder adjacent the back support may be used to support the stem of a sun-shade umbrella. When the tailgate is in its upright closed position, a compartment holding the speakers, the back support and the umbrella holder closes to the inside surface of the upright tailgate and a pivotable cover element is locatable over a top of the compartment to exclude ambient dirt and moisture. This user-convenience assembly is readily mountable to most conventional pick-up truck tailgates.

21 Claims, 4 Drawing Sheets

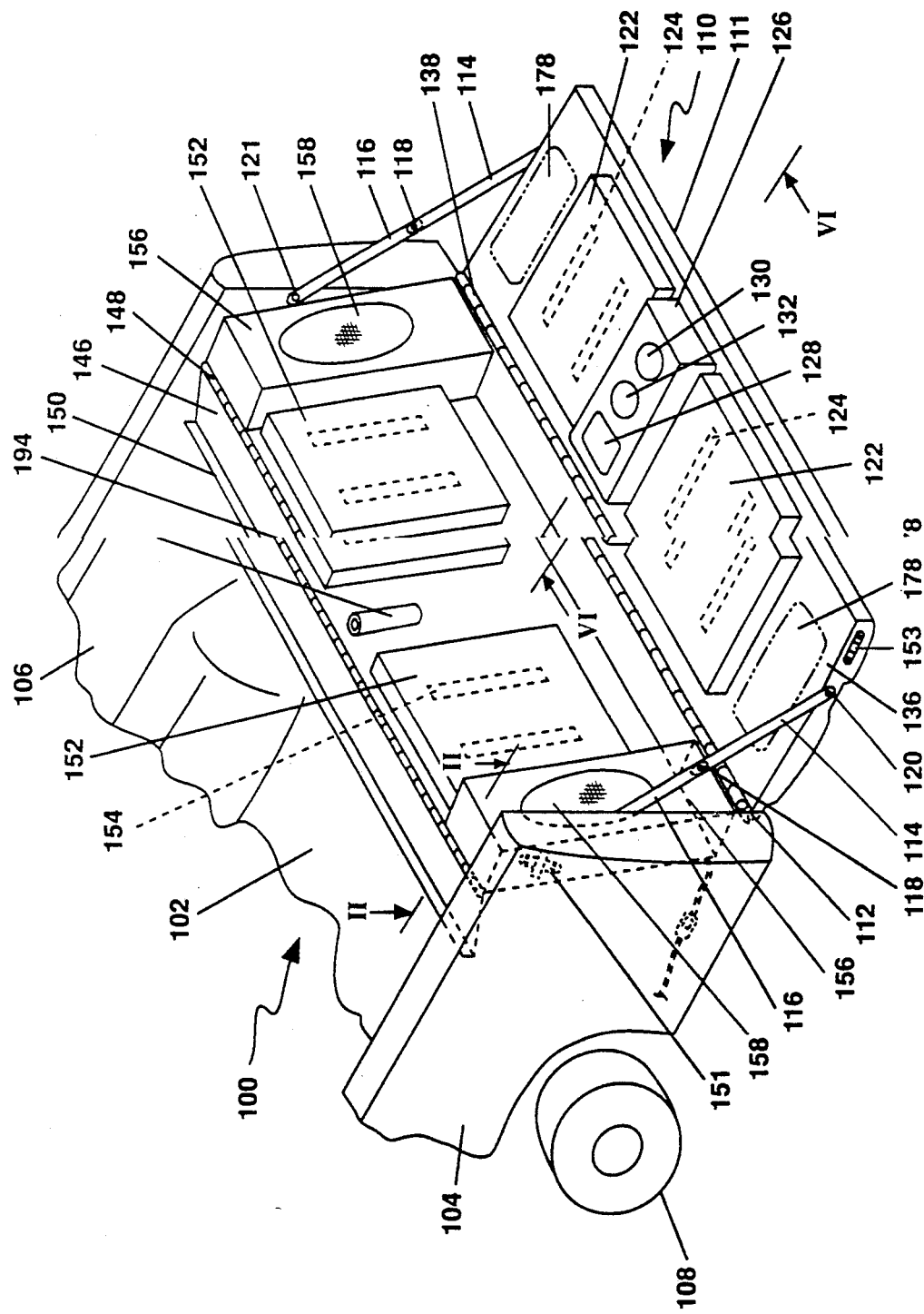

PICK-UP TRUCK TAILGATE SEATING AND ENTERTAINMENT SYSTEM

FIELD OF THE INVENTION

This invention relates to a system to facilitate user seating on a pick-up truck tailgate, and more particularly to a system for a pick-up truck tailgate to provide comfortable seating, aural entertainment and convenient dining for one or more users.

BACKGROUND OF THE PRIOR ART

Pick-up trucks have wide acceptance as the primary vehicle of choice, not just for people like mechanics and technicians who need to carry equipment or materials but also for active single persons as well as couples. Users of pick-up trucks often go to conventional social gatherings, e.g., baseball games, picnics, outdoor entertainment performances, and the like, in their pick-up trucks. It is rather limiting for such a person to simply sit in the cab of the pick-up truck all of the time. Equally obviously, it is uncomfortable for a person to simply sit on a lowered tailgate for extended periods of time. There is, therefore, a need for a pick-up truck which allows a user to be comfortably seated on his or her vehicle tailgate, possibly with a companion, on a cushioned seat with back support. The set-up should allow a person to safely place lighted cigarettes, cans or glasses of liquid refreshment, and personal items such as solid foods, eye glasses, and the like, within reach. Preferably, the user should also be able to listen to sound from the truck's radio, tape player, or cassette player, and simultaneously be able to receive shelter from sunlight or rain. Although there have been some efforts to address such needs, there does not appear to be presently available a simple improved truck structure having all of these features.

An early attempt to add to the structure of a conventional automobile element to meet some of these needs is found in U.S. Pat. No. 2,228,203, to de Hoffmann, titled "Combination Rack and Automobilist's Collapsible Outfit". The rack in this invention is designed to be clamped on to the rear bumper of an automobile, to provide at least partial support for a bottom and back support of a seat so that the user may sit thereon facing rearwardly over the rear bumper. In other embodiments, the structure is shown as capable of being extended to be supported, at least partially, in contact with the ground behind the automobile.

For the specific needs of the pick-up truck owner, U.S. Pat. No. 5,000,504, to Munguia, provides a "Swivel Seat Attachable to a Truck Tailgate". It employs a clampable support element which may be clamped to a lowered tailgate, to support a base for a swivel seat having a bottom and a pivotable back support to enable a single individual to sit above and be totally supported by the lowered tailgate of the pick-up truck.

U.S. Pat. No. 2,982,578, to Lowe, teaches an elaborate structure mounted to the floor of a panel truck for supporting items of food and beverage on a slidable extension, which in use, would be partially supported by ground behind the mobile catering truck.

U.S. Pat. No. 4,824,163, to Hendrych, teaches a convertible cover suitable for mounting over the top of a trailer or the load compartment of a pick-up truck. The cover is removably secured over the truck and has a top wall with at least one opening spaced from an edge of the top wall to form a seat section on the top wall intermediate the opening and an adjacent side edge of the top wall. A flat removable panel is secured in a close fit on the top wall and overlies at least the opening formed therein. Provision is made for supporting an upright stem of a large sun umbrella to provide shelter to persons seated on opposite sides of the central opening.

As noted, such solutions do not fully and economically meet the perceived needs. The present invention is intended to do so.

SUMMARY OF THE INVENTION

It is a principal object of this invention to provide an improvement to a conventional pick-up truck, to enable two persons to sit in cushioned comfort on a lowered tailgate of the pick-up truck.

It is another object of this invention to provide, in a conventional pick-up truck, a tailgate-mounted structure to enable one or two individuals to sit in cushioned comfort on the lowered tailgate with cushioned back support and have the facility for listening to music from two spaced-apart speakers receiving signals from the truck's sound system.

It is an even further object of this invention to provide, in a conventional pick-up truck, a tailgate-mounted structure to enable one or two individuals to sit in comfort with cushioned seat and back support on a lowered tailgate of the truck, with the facility to listen through two speakers optionally connectable to the truck's radio, tape player or compact disk player, while also being provided a central ashtray and secure support for one or more beverage containers and room to place personal items or food containers adjacent to the bottom cushions.

It is an even further related object of this invention to provide a conventional pick-up truck with a tailgate-mounted structure which can be folded safely out of use when the tailgate is in its raised position and which, with the tailgate down, provides cushioned bottom and back support to two users, wherein individual bottom and back support cushions are readily detachable from the truck and are formed to be usable as emergency floatation devices.

These and other related objects and purposes of this invention are realized by providing in a pick-up truck having a pivotable tailgate mounted to be supported to the truck body in a substantially horizontal open position and pivotable to a substantially upright closed position, a user-convenience assembly, comprising:

first user-support means for supporting a user, mounted to an inside surface of the tailgate; and a compartment mounted to the inside surface of the tailgate to be pivotable thereon about a horizontal axis to a substantially upright operational position when the tailgate is in its substantially horizontal open position, said compartment comprising second user-support means cooperating with the first user-support means for supporting a user when the tailgate is in its horizontal open position.

DETAILED DESCRIPTION OF THE PREFERRED EMBODIMENTS

Figure 1:
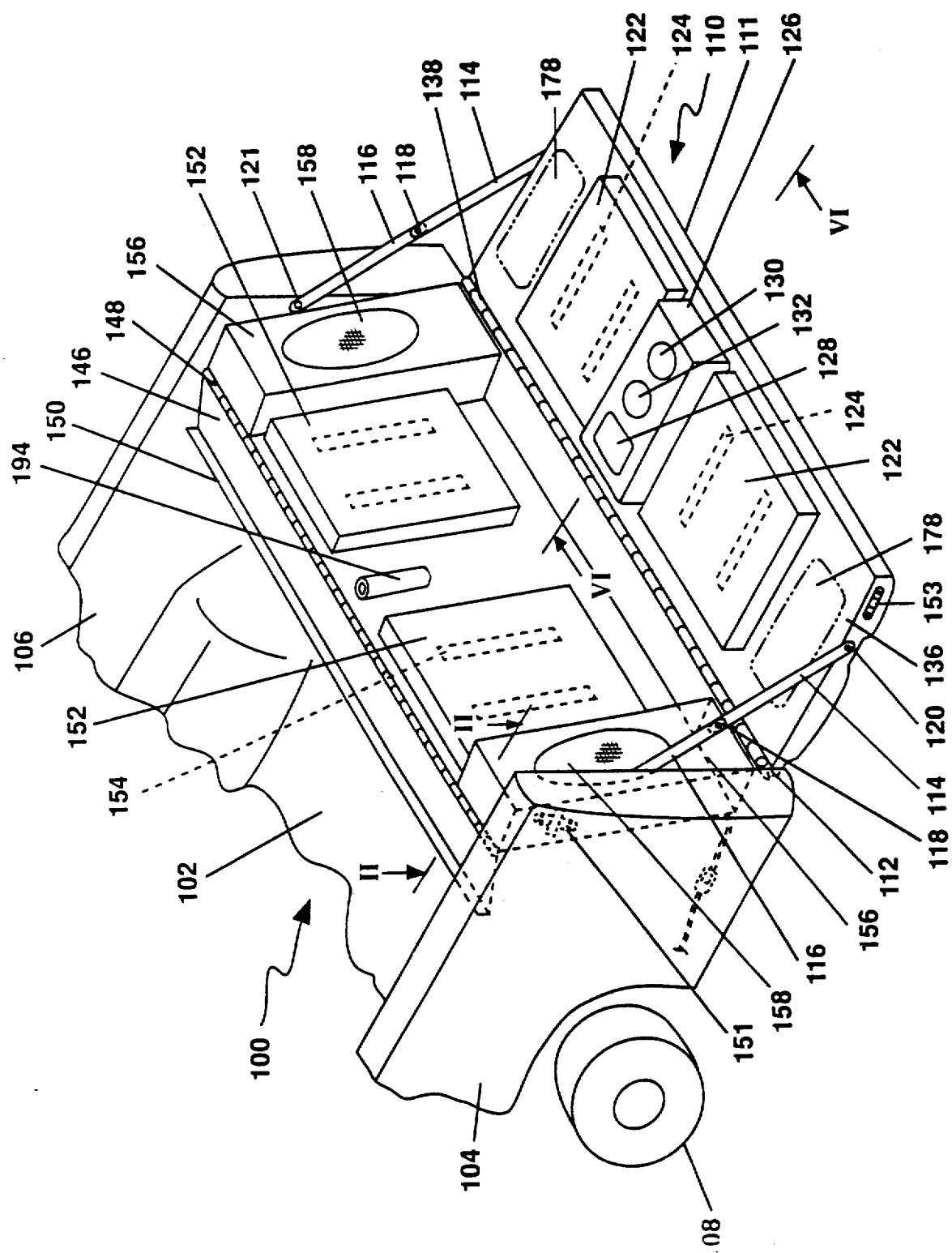
FIG. 1 is a perspective view of the rear end of a pick-up truck provided with a conventional tailgate structure incorporating a preferred embodiment of this invention.

As best seen in FIG. 1, the rearmost portion of a conventional pick-up truck body has a floor 102, side walls 104, 106, rear wheels 108, 108 (only one visible), and a tailgate 110 which is typically pivotable about a pair of strong pivots 112, 112 (only one visible) at the rearmost transverse edge of floor 102.

Also, such a typical tailgate is partially supported by a two-piece stay element on each side, each comprising a lower stay 114 and an upper stay 116 pivotably attached thereto at a pivot 118. The lowest end of each of the lowest stays 114 is pivotably connected to an outside end surface of tailgate 110 at a pivot bolt 120 (only one visible). Similarly, the upper-most end of each of the upper stays 116 is pivotably connected to a corresponding side wall of the truck at a pivot bolt 121 (only one visible). With this arrangement, when tailgate 110 is raised to its upper or closed position, stays 114 and 116 on each side pivot relative to each other about pivots 118, 118 and are essentially moved out of the way. On the other hand, when tailgate 110 is placed in its open or lowered position, the combination of stays and pivot bolts just described cooperates to support a part of the weight of the tailgate and any loads placed thereon. Other alternative elements, e.g., a length of cable or chain, may be employed in place of the exemplary two-piece stay to support the tailgate in its lowered position.

The present invention is intended to provide a user-convenience assembly for convenient and comfortable seating support to one or more persons at the rear of the pick-up truck.

Referring again to the preferred embodiment of this invention per FIG. 1, individual seating support is readily provided to one or more persons in, for example, a symmetrical side-by-side arrangement. For this there is provided a pair of bottom support cushions 122, 122, which are most conveniently retained to an inside surface 136 of tailgate 110 by one or more pressure-sensitive attachment-strips 124, 124. A well-known example of such attachment means is Velcro (TM), which consists of two cooperating layers, one provided with a multitude of small hooks and the other with a multitude of small loops, the two elements being secured to one another by a pressure sufficient to engage a large number of the small hooks into loops. The two elements may be separately adhered to a lower surface of a cushion and to the inner surface of tailgate 110, respectively. To remove the cushion, a user merely needs to start lifting from one corner and to then apply sufficient force to disengage the hooked element from the looped element. Also provided may be a central element 126, preferably formed of a molded plastics material or light metal, e.g., aluminum, to support an ashtray 128 and to provide a couple of recesses 130, 132 each shaped and sized to hold the lower portions of a beverage can or a typical picnic glass.

Along an inside edge of the inside surface 136 of tailgate 110 there is provided an elongate hinge 138, of the type commonly referred to as a "piano hinge", to pivotably mount to tailgate 110 a compartment 140 which preferably has the general form of an open rectangular box. Reference to the vertical cross-sectional view of FIG. 2 clearly shows the preferred generally rectangular vertical cross-section of compartment 140. It comprises a bottom wall 142, a back wall 144 and a cover 146 pivotably attached to a top edge of back 144 by another "piano hinge" 148. Cover 146 has an angled overlap flap portion 150.

Figure 2:
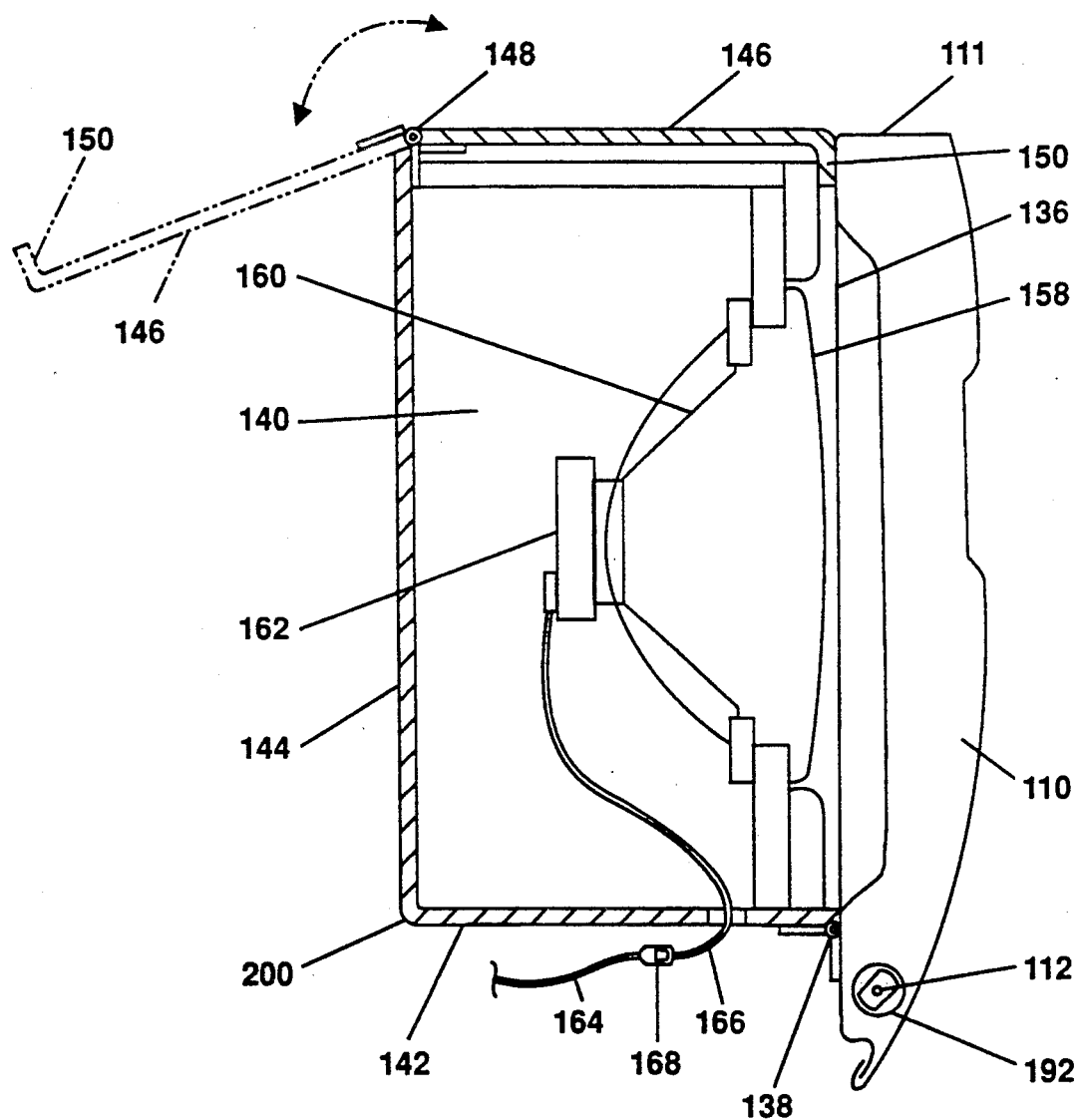
FIG. 2 is a cross-sectional view, at section II—II in FIG. 1, of a conventional pick-up truck tailgate modified according to the preferred embodiment per FIG. 1.
Figure 3:
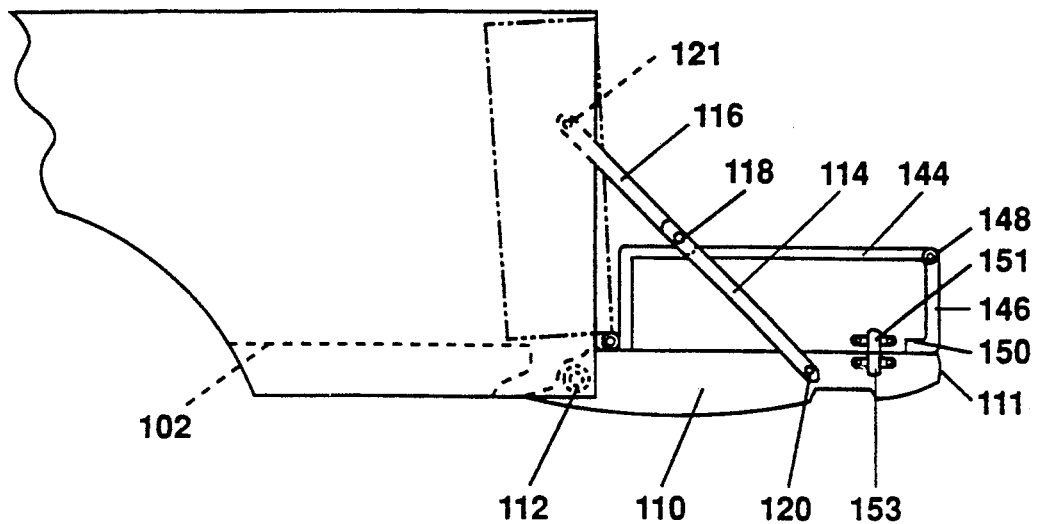
FIG. 3 is a partial vertical elevation view of the pick-up truck according to FIG. 1, with the tailgate lowered to its open position but before deployment of the user-convenience assembly of elements as illustrated in FIG. 1.

FIG. 2 should be seen as illustrating how compartment 140 is pivotably supported at "piano hinge" 138 and how it is brought into close contact with inside surface 136 of tailgate 110, with cover 146 pivoted about "piano hinge" 148. Flap 150 lies against inside surface 136 of tailgate 110 and cover 146 and top surface 111 of tailgate 110 are then level with each other when tailgate 110 is in its upright or closed position to close the pick-up truck load bed. This is indicated by phantom lines in FIG. 2, although FIG. 2 also seeks to illustrate a hinged open disposition of cover 146.

Returning now to FIG. 1, it is seen how a pair of back support cushions 152, 152 may be detachably attached to an inside surface of back 144 of compartment 140 by pressure responsive attachment means, e.g., Velcro (TM) strips 154, 154. By this arrangement, the cushions can be readily detached just like bottom cushions 122, 122 and, within bounds, relocated to suit the specific needs of individual users.

In the preferred embodiment according to FIG. 1, there is also provided a pair of speakers 156, 156, each having its own box-like shape and a facing with a decorative grill 158. Behind each grill 158 is mounted a speaker mechanism including a diaphragm 160, best seen in FIG. 2. The sound-producing element 162 which actuates each diaphragm 160 may be electrically connected, for example by a ground wire 164, to the body 100 of the pick-up truck through tailgate 110. A power wire 166, or other type of electrical connector, may be provided to extend from the mechanism 162 to extend through the bottom 142 of compartment 140 so as to end in a connecter element 168. Connecter element 168 to provide electrical power to an individual speaker may be readily connected in known manner to the conventional apparatus in the pick-up truck, e.g., a radio, a tape player or a compact disc player (not shown) which generates a signal convertible to sound. By this means, persons seated at the back of the pick-up truck may enjoy music, news, commentary on a ball game, or the like, through their own personal speakers disposed immediately adjacent to their seating positions.

Figure 7:
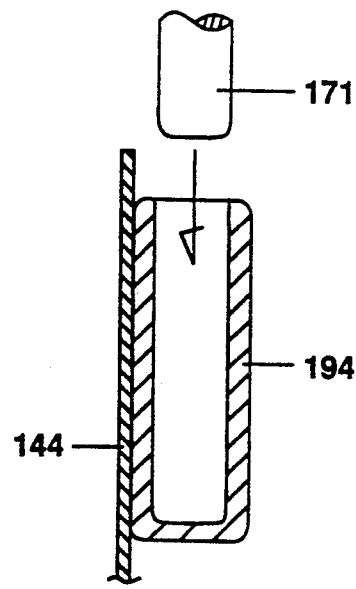
FIG. 7 is a vertical longitudinal cross-sectional view of a generally cylindrical element to be mounted to an inside surface of the speaker and back support compartment to receive and substantially vertically support a stem portion of an optional sun umbrella.

In the embodiment of FIG. 1, there is also provided a generally cylindrical blind support element 194 for receiving and securely holding a lower end of a rod-like stem of a conventional sun-shade umbrella (not shown for simplicity). This cylindrical support element 194 may conveniently be made of a metal and have a closed bottom, and be of a size that is not intrusive to persons seated on the cushions provided on the tailgate. See also FIG. 7. Cylindrical support element 194 may be used with equal facility to support an elongate element 171 attached to other objects of interest to the user, e.g., a flag, a pennant, a sign, or the like.

To summarize the above description, FIGS. 1 and 2 illustrate a preferred embodiment of this invention which provides two users with comfortable side-by-side cushioned seating and back support, with an ashtray and drinks holding element between them. Also provided are two speakers, one on the outside of each seated person, and a facility to dispose a large umbrella over them for shade or protection. Furthermore, the compartment containing the speakers and the back support cushions can be readily pivoted to contact the inside surface of the pick-up truck tailgate, and the compartment is securely held to the tailgate by engagement with clasps 151 (only one shown) provided on compartment 140 to engage with correspondingly disposed engagement elements 153 (only one shown) provided on tailgate 110.

A user of this invention, as described above, would typically park his or her pick-up truck with the back end thereof facing an area or an activity of interest, e.g., a lake, a playground, a picnic, a baseball game, or the like. With the pick-up truck securely parked, the user unlatches compartment 140 from tailgate 110. Tailgate 110 is then lowered to its lowermost position. The compartment 140 is placed into its upright position and cover 146 and flap 150 are hinged away from the top edge of compartment 140.

For security, and to discourage vandalism, a simple key-operated locking mechanism may be provided to retain flap 150 to tailgate 110. This may be of any common or known type and, therefore, is not specifically illustrated.

As will be readily understood by reference to FIGS. 1 and 2 together, compartment 140 inclines toward the inside of the pick-up truck bed until its innermost edge 200 contacts floor 102. In this disposition, tailgate 110 is fully supported by hinge bolts 112, 112 via trunnions 192, one on each side of the tailgate. At the same time, compartment 140 is totally supported by "piano hinge" 138 and contact with floor 102. By suitable choice of dimensions, compartment 140 can be disposed at a small angle from the vertical, as generally indicated in FIGS. 1 and 4, so that the back support cushions 152, 152 are correspondingly inclined at a comfortable angle "α for persons supported thereby.

Figure 4:
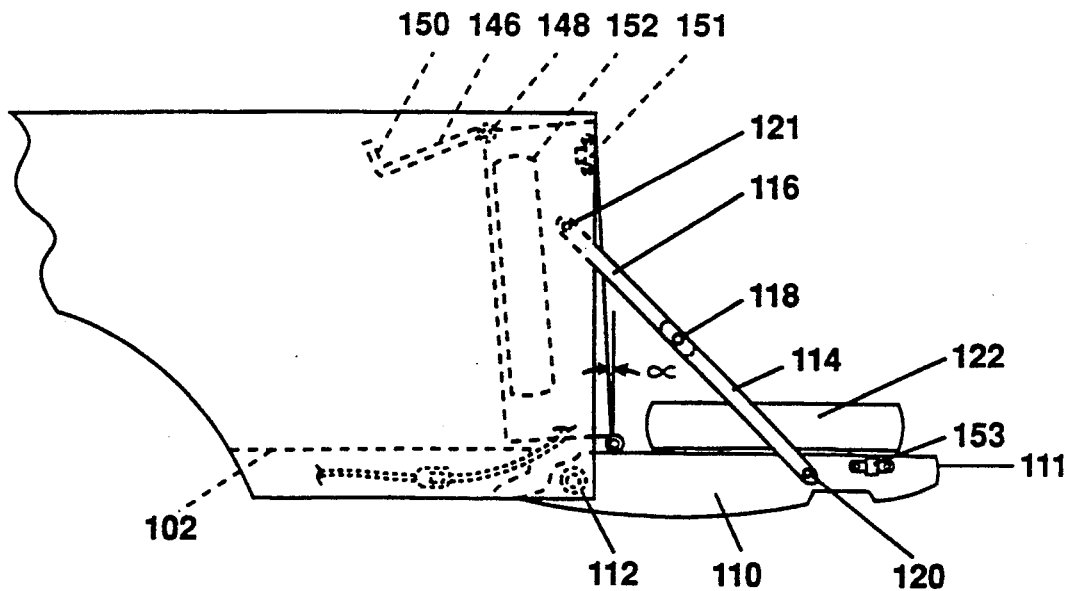
FIG. 4 is a view comparable to that of FIG. 3, with the tailgate in its lowered position and a pivotable compartment containing seat backs and speakers moved out to its near vertical position to be partially supported by the pick-up truck floor.
Figure 5:
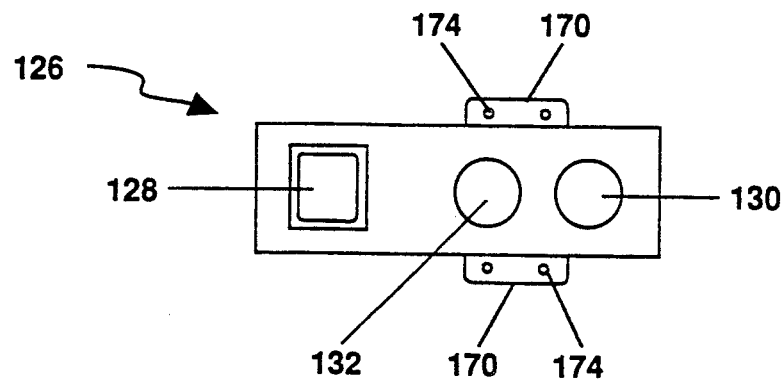
FIG. 5 is a plan view of the ashtray/beverage container support element per FIG. 1.

FIGS. 4 and 5 illustrate a slight variation of the above-described initial steps of deploying the assembly, wherein the tailgate is first lowered and the compartment released therefrom and rotated back into the truck.

FIG. 4 also illustrates the just described disposition of the back support cushions at a slight angle "α" from the vertical to provide comfortable seating.

FIG. 5 is a plan view of element 126 which supports an ashtray 128 and provides recesses 130, 132 to hold beverage containers or glasses. Such an element, like the other elements described above, may be inexpensively formed of a plastics material or a lightweight metal. In either case, a convenient structure for this element would include transverse flanges 170, 170 formed with bolt holes 174, 174 through which bolts, screws, rivets, or the like may be passed to attach the same to tailgate 110.

Figure 6:
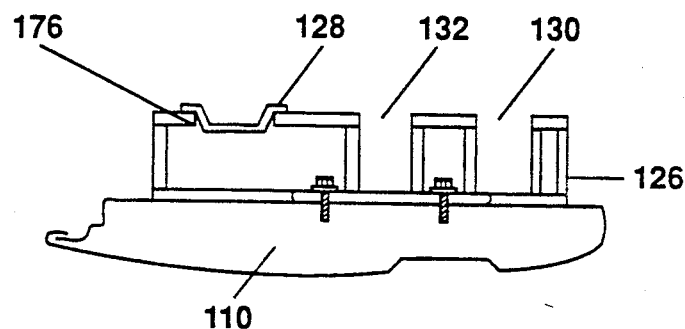
FIG. 6 is a vertical cross-sectional view, at Section VI—VI in FIG. 1, of an ashtray and beverage container support element to be mounted to an inside surface of the tailgate between the bottom cushions in the preferred embodiment according to FIG. 1.

FIG. 6 is a vertical cross-sectional view through the central line of the element 126. As is readily seen, ashtray 128 may be set in readily removably manner into a suitably sized aperture 176 formed in an upper surface of element 126.

Referring back to FIG. 1, the typical tailgate of a full-size pick-up truck may be wide enough to provide additional space outboard of each of the bottom support cushions 122, 122 in the form of shallow recesses 178, 178. As persons of ordinary skill in the mechanical arts will appreciate, sheet metal of the type used to form strong pick-up truck tailgates is never left entirely flat in regions where rigidity is inherently required. In other words, what has hitherto been referred to as the inside surface of tailgate 110 will preferably, for practical reasons, be formed as other than a totally non-planar surface and will most likely have a plurality of ridges, ribs or depressions to increase the overall stiffness and strength of the tailgate.

If the present invention is offered as a standard option on a particular line of pick-up trucks, advance planning should permit formation of a tailgate 110 with shallow depressions 178, 178 built in. These can be made of suitable size and in suitable location to facilitate the placement of light objects like sunglasses, a magazine, and light items of food such as a bag of potato chips, in such a manner that a casual gust of wind will not readily blow away the item. These, obviously, are niceties that go to fully delivering the invention to the intended beneficiaries, namely persons who may frequently utilize the advantages provided by the present invention.

However, the preferred embodiment of this invention may also quite readily be enjoyed by persons who already own pick-up trucks and wish to extend their enjoyment thereof. In other words, all of the elements described above, which together constitute a user-convenience system for increasing the utility of conventional pick-up trucks, can be formed and installed in any existing pick-up truck, provided consideration is given to specific requirements of the necessary dimensions for compartment 140, cushions 122, and the like. The long "piano hinge" 138 can be a long strong hinge of any known type, wherein two coacting elements are connected by a hinge rod passing through both. In the alternative, a plurality of shorter hinges may be used in place of the long piano hinge 138. One of the elements can be readily welded, riveted, part riveted, or otherwise firmly attached to the inside surface of the tailgate 110 of an existing pick-up truck. By suitable selection of the location of this portion of the "piano hinge" 138, and by suitably dimensioning the compartment 140 attached to the other portion of the hinge 138, one can ensure that the back support cushions 152, 152 will be disposed at a comfortable angle "α" with respect to the vertical.

Tailgate 110 continues to be useable in a normal manner, e.g., it can be used to close the load bed of the pick-up truck.

Considering the highly complex customizations, both mechanical and stylistic, that are affordable to many automobile enthusiasts and van customizers, it is believed that the present invention can be very easily adapted in obvious manner to suit a variety of existing pick-up truck structures.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

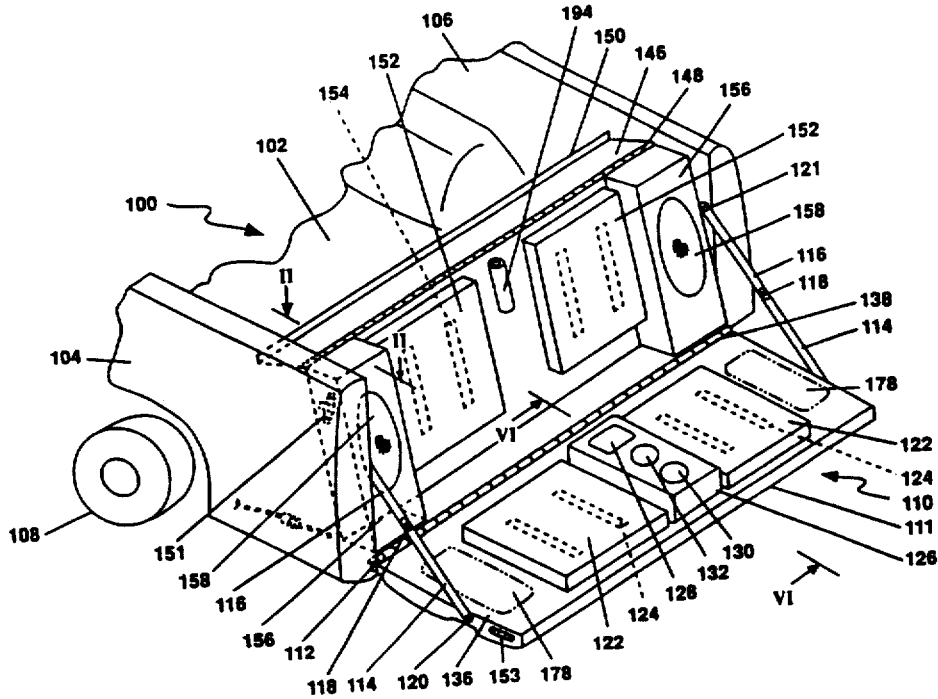

What is claimed is:

1. In a pick-up truck having a pivotable tailgate mounted to be supported to the body of the truck in a substantially horizontal open position and pivotable to a substantially upright closed position, a user-convenience assembly, comprising:

first user-support means for supporting a user, mounted to an inside surface of the tailgate; and a compartment mounted to the inside surface of the tailgate to be pivotable thereon to a substantially upright operational position when the tailgate is in its open position, said compartment comprising second user-support means cooperating with the first user-support means for further supporting the user when the tailgate is in its open position.

2. The user-convenience assembly according to claim 1, further comprising:

sound delivery means mounted to a surface of the compartment for receiving a signal and converting it to sound near the second user-support means.

3. The user-convenience assembly according to claim 2, further comprising:

means for connecting and disconnecting the sound delivery means from the sound system.

4. The user-convenience assembly according to claim 1, further comprising:

an element mounted to the inside surface of the tailgate to hold at least one of an ashtray and a food container.

5. The user-convenience assembly according to claim 1, further comprising:

support means mounted to the compartment for supporting means for providing protective and/or visual entity over the first and second user-support means.

6. The user-convenience assembly according to claim 1, further comprising:

cover means pivotably supported to the compartment to be pivotable to an open position away from the second user-support means when the compartment is in its operable position and pivotable to a compartment-covering position when the compartment is pivoted toward the inside surface of the tailgate, the cover means having a cover flap which fits against the inside surface of the tailgate when the cover means is placed in its compartment-covering position.

7. The user-convenience assembly according to claim 1, wherein:

the first user-support means comprises a first cushion and first cushion attaching means for detachably mounting the first cushion to the inside surface of the tailgate.

8. The user-convenience assembly according to claim 1, wherein:

the second user-support means comprises a second cushion and a second cushion attaching means for detachably attaching the second cushion to the compartment.

9. The user-convenience assembly according to claim 7, wherein:

the second user-support means comprises a second cushion and a second cushion attaching means for detachably attaching the second cushion to the compartment.

10. The user-convenience assembly according to claim 9, wherein:

at least one of the first and second cushions includes a floatation material and is formed to be usable as an emergency life preserver.

11. The user-convenience assembly according to claim 6, further comprising:

a sound system for providing a signal convertible to sound and;

sound delivery means mounted to a surface of the compartment for receiving a signal from the sound system and for converting it to sound near the second user-support means.

12. The user-convenience assembly according to claim 11, further comprising:

an element mounted to the inside surface of the tailgate to hold at least one of an ashtray and a food container.

13. The user-convenience assembly according to claim 12, further comprising:

support means mounted to the compartment for supporting shading means for providing protective and/or visual entity over the first and second user-support means.

14. The user-convenience assembly according to claim 13, wherein:

the first user-support means comprises a first cushion and first cushion attaching means for detachably attaching the first cushion to the inside surface of the tailgate; and the second user-support means comprises a second cushion and a second cushion attaching means for detachably attaching the second cushion to the compartment.

15. The user-convenience assembly according to claim 14, wherein:

at least one of the first and second cushions includes a floatation material and is formed to be usable as an emergency life preserver.

16. The user-convenience assembly according to claim 15, further comprising:

a third cushion similar to the first cushion, the first and third cushions being symmetrically disposed with respect to the inside surface of the tailgate, with said element for holding at least an ashtray and a food container disposed between the first and third cushions.

17. The user-convenience assembly according to claim 16, further comprising:

a fourth cushion similar to the second cushion, the second and fourth cushions being symmetrically disposed with respect to the compartment with the protective and/or visual entity support means being support means disposed between the second and fourth cushions.

18. The user-convenience assembly according to claim 17, further comprising:

means formed to be supported by the supporting means for providing protection and/or visual entity to a user of the user-convenience assembly.

19. The user-convenience assembly according to claim 17, wherein:

the first and third cushions are sized such that portions of the inside surface of the tailgate extend outwardly thereof to an extent sufficient to provide additional support surface.

20. The user-convenience assembly according to claim 17, wherein:

the sound delivery means comprises two speakers mounted to the compartment respectively outward of the second and fourth cushions.

21. The user-convenience assembly according to claim 2, further comprising:

a sound system for producing a signal convertible to sound.

* * * * *

UNITED STATES PATENT AND TRADEMARK OFFICE
CERTIFICATE OF CORRECTION

PATENT NO. : 5,215,346

DATED : June 1, 1993

INVENTOR(S) : Reitzloff et al

It is certified that error appears in the above-identified patent and that said Letters Patent is hereby corrected as shown below:

The title page showing the illustrative figure should be deleted to be replaced witht he attached title page.

Sheet 1 of the drawings, consisting of Figure 1, should be deleted to be replaced with the sheet of drawing, consisting of Figure 1, as shown on the attached page.

Signed and Sealed this

Ninth Day of November, 1993

*Attest:*

BRUCE LEHMAN

*Attesting Officer*     Commissioner of Patents and Trademarks

United States Patent [19]

Reitzloff et al.

[11] Patent Number: 5,215,346
[45] Date of Patent: Jun. 1, 1993

[54] PICK-UP TRUCK TAILGATE SEATING AND ENTERTAINMENT SYSTEM

[75] Inventors: Cliff R. Reitzloff, Farmington; David M. Glorio, Okemos; David H. Hughes, Auburn Hills, all of Mich.

[73] Assignee: Nissan Research and Development, Inc., Farmington Hills, Mich.

[21] Appl. No.: 904,086

[22] Filed: Jun. 25, 1992

[51] Int. Cl.⁵ .................................. B62D 25/00
[52] U.S. Cl. ........................... 296/51; 296/37.6; 296/65.1
[58] Field of Search ............. 296/51, 57.1, 65.1, 296/37.6, 24.1

[56] References Cited

U.S. PATENT DOCUMENTS

| | | | |
|---|---|---|---|
| 2,228,203 | 3/1938 | de Hoffmann | 5/119 |
| 2,982,578 | 5/1956 | Lowe | 296/22 |
| 4,444,429 | 4/1984 | Dawes | 296/51 X |
| 4,824,163 | 4/1989 | Hendrych | 296/100 |
| 4,887,526 | 12/1989 | Blatt | 108/44 |
| 5,000,504 | 3/1991 | Munguia | 296/65.1 |

Primary Examiner—Robert R. Song
Attorney, Agent, or Firm—Lowe, Price, LeBlanc & Becker

[57] ABSTRACT

A user-convenience assembly, mountable to an inside surface of a conventional pick-up truck tailgate, is usable with the tailgate placed in a substantially horizontal open position to provide at least one user with bottom and back support on separate cushions provided therefor. Speakers connectable to a sound system of the pick-up truck are disposed adjacent the back support to provide a user music and sound. An element to hold an ashtray and at least one food container can be mounted adjacent to the bottom support, and an umbrella holder adjacent the back support may be used to support the stem of a sun-shade umbrella. When the tailgate is in its upright closed position, a compartment holding the speakers, the back support and the umbrella holder closes to the inside surface of the upright tailgate and a pivotable cover element is locatable over a top of the compartment to exclude ambient dirt and moisture. This user-convenience assembly is readily mountable to most conventional pick-up truck tailgates.

21 Claims, 4 Drawing Sheets